United States Patent
Araki et al.

(10) Patent No.: US 11,794,988 B2
(45) Date of Patent: Oct. 24, 2023

(54) CARGO CONTAINER

(71) Applicant: SHIBAKAI CO., LTD., Tokyo (JP)

(72) Inventors: Manabu Araki, Tokyo (JP); Toru Araki, Tokyo (JP)

(73) Assignee: SHIBAKAI CO., LTD., Tokyo (JP)

( * ) Notice: Subject to any disclaimer, the term of this patent is extended or adjusted under 35 U.S.C. 154(b) by 227 days.

(21) Appl. No.: 17/057,769

(22) PCT Filed: May 29, 2018

(86) PCT No.: PCT/JP2018/020533
§ 371 (c)(1),
(2) Date: Nov. 23, 2020

(87) PCT Pub. No.: WO2019/229844
PCT Pub. Date: Dec. 5, 2019

(65) Prior Publication Data
US 2021/0206566 A1 Jul. 8, 2021

(51) Int. Cl.
*B65D 90/18* (2006.01)
*B65D 88/12* (2006.01)
(Continued)

(52) U.S. Cl.
CPC .............. *B65D 90/18* (2013.01); *B60B 33/04* (2013.01); *B60B 33/06* (2013.01); *B65D 88/121* (2013.01); *B65D 90/0033* (2013.01)

(58) Field of Classification Search
CPC .. B65D 90/18; B65D 88/121; B65D 90/0033; B60B 33/06; B60B 33/063; B60B 33/066; B60B 33/04; B60B 33/045
See application file for complete search history.

(56) References Cited

U.S. PATENT DOCUMENTS 3,041,083 A * 6/1962 Blanc ............... B65D 90/18
280/43.21
3,570,694 A 3/1971 Tantlinger
(Continued)

FOREIGN PATENT DOCUMENTS

DE  1039936 B   9/1958
DE  9321110 U1  2/1996
(Continued)

OTHER PUBLICATIONS

International Search Report for corresponding Application No. PCT/JP2018/020533, dated Jul. 24, 2018.

*Primary Examiner* — John K Fristoe, Jr.
*Assistant Examiner* — Jennifer Castriotta
(74) *Attorney, Agent, or Firm* — Renner, Otto, Boisselle & Sklar, LLP

(57) ABSTRACT

To avoid or reduce the necessity of loading a cargo container on a container carrying vehicle, for example, a cargo container 100 includes: engaging portions 101b disposed at four corners of each of upper and lower surfaces of a shell 101 and each engageable with a spreader of a container crane; and a wheel 113 capable of supporting the cargo container 100 such that the cargo container 100 is allowed to run. The wheel 113 is switchable between a runnable state where at least a lowermost portion is located below a bottom surface 101c of the cargo container 100 and supports the cargo container 100 such that the cargo container 100 is allowed to run, and a loaded state where the wheel 113 moves inward from the bottom surface 101c and the bottom surface 101c is allowed to make contact with a mount surface of the cargo container 100.

5 Claims, 3 Drawing Sheets

(51) Int. Cl.
   *B60B 33/04*     (2006.01)
   *B65D 90/00*     (2006.01)
   *B60B 33/06*     (2006.01)

(56)  References Cited

U.S. PATENT DOCUMENTS

| | | | | |
|---|---|---|---|---|
| 4,936,733 | A | * | 6/1990 | Girerd .................. B62B 5/0083 |
| | | | | 414/458 |
| 5,044,544 | A | * | 9/1991 | Grogan .................. B65D 90/00 |
| | | | | 228/119 |
| 5,806,863 | A | | 9/1998 | Heger et al. |
| 6,749,388 | B1 | * | 6/2004 | Schmidt ............... B65D 88/129 |
| | | | | 414/459 |
| 10,336,135 | B1 | * | 7/2019 | Engelbrecht ........ B60B 33/0063 |
| 2018/0037406 | A1 | | 2/2018 | Araki |

FOREIGN PATENT DOCUMENTS

| | | |
|---|---|---|
| EP | 1199259 A1 | 4/2002 |
| JP | 2004-284528 A | 10/2004 |
| JP | 2007-320727 A | 12/2007 |
| JP | 2011-153025 A | 8/2011 |
| WO | 2016/139698 A1 | 9/2016 |

\* cited by examiner

CARGO CONTAINER

TECHNICAL FIELD

The present invention relates to a cargo container that contains cargo therein for conveyance.

BACKGROUND ART

Container ships and the like perform transportation using standardized cargo containers. Conveyance of such cargo containers using a container port or the like uses container carrying vehicles for conveying container transportation pallets to which containers have been transported and integrated vehicles that travel on roads with containers loaded thereon (see, for example, Patent Documents 1 and 2).

CITATION LIST

Patent Documents

PATENT DOCUMENT 1: Japanese Patent Application Publication No. 2007-320727
PATENT DOCUMENT 2: Japanese Patent Application Publication No. 2011-153025

SUMMARY OF THE INVENTION

Technical Problem

In the case of using, for example, container carrying vehicles as described above, it is necessary to load and unload containers on/from such vehicles as well as the necessity of using a plurality of container carrying vehicles in order to increase conveyance efficiency.

It is therefore an object of the present invention to avoid or reduce the necessity of, for example, loading cargo containers on container carrying vehicles and the like.

Solution to the Problem

To achieve the object, the present invention provides a cargo container for marine transportation of cargo, and the cargo container includes: engaging portions disposed at four corners of each of upper and lower surfaces of a shell, each of the engaging portions being engageable with a spreader of a container crane; and a wheel configured to support the cargo container such that the cargo container is allowed to run, wherein the wheel is switchable between a runnable state and a loaded state, in the runnable state, at least a lowermost portion of the wheel is located below a bottom surface of the cargo container and supports the cargo container such that the cargo container is allowed to run, and in the loaded state, the wheel moves inward from a bottom surface of the cargo container and the bottom surface is allowed to make contact with a mount surface of the cargo container.

With this configuration, the cargo container is capable of easily traveling on the ground without using a trailer, a carriage, or the like, for example, and efficiency of loading and availability of berths, for example, can be easily enhanced.

Advantages of the Invention

According to the present invention, it is possible to avoid or reduce the necessity of, for example, loading cargo containers on container carrying vehicles or the like.

DESCRIPTION OF EMBODIMENTS

Figure 1:
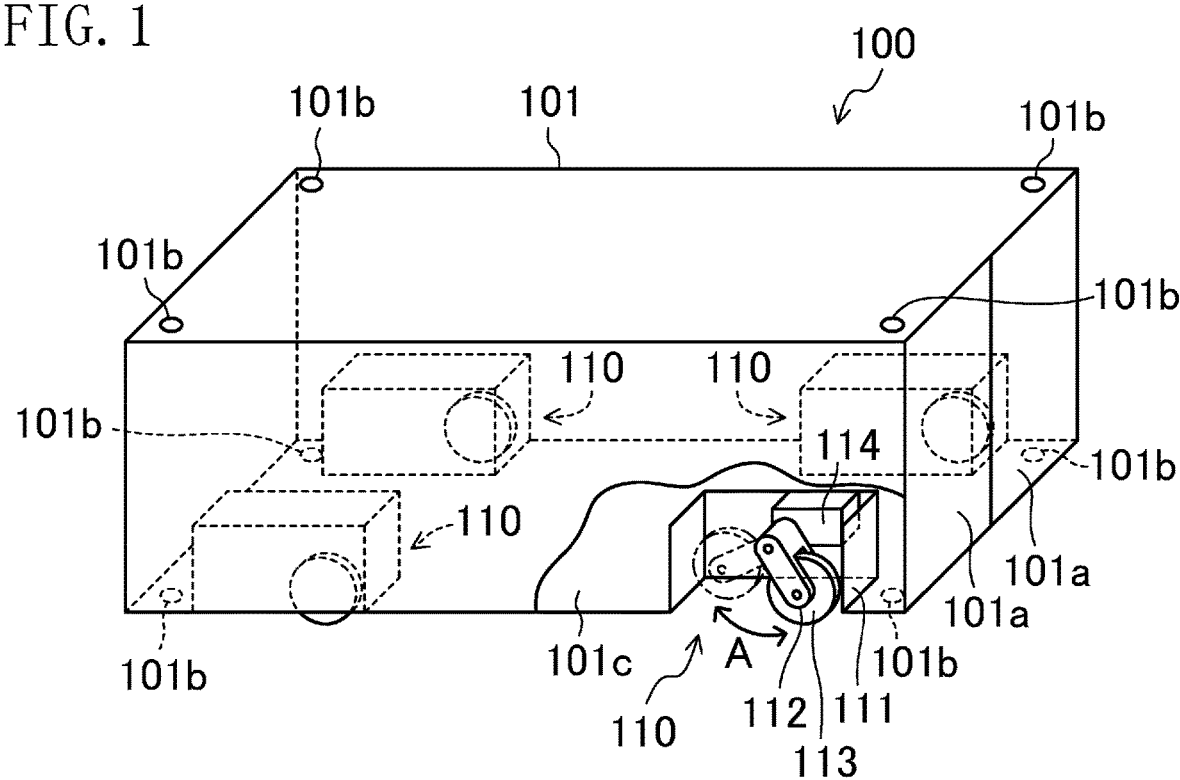
FIG. 1 A perspective view illustrating a configuration of a cargo container according to a first embodiment.

Embodiments of the present invention will be described in detail with reference to the drawings. In the following embodiments and variations thereof, components identical or similar to those described in other embodiments will be denoted by the same or corresponding reference characters, and description thereof will not be repeated.

First Embodiment

As illustrated in FIG. 1, a cargo container 100 has a size and a shape conforming to, for example, the ISO standard, and is to be loaded on a container ship for marine transportation of cargo. A longitudinal end of the cargo container 100 is provided with a door 101*a* that is pivotable about a pivoting axis and configured to be opened and closed. Four corners of one or both of top upper and lower surfaces of a shell 101 of the cargo container 100 are provided with engaging portions 101*b* that are called twist locks and engaged with joint tools or a gantry crane, for example.

A wheel portion 110 having a wheel 113 and surrounded by a wheel partition 111 is provided near each of the four corners of a bottom surface 101*c* (floor surface) of the shell 101, Each wheel 113 is switchable between a runnable state and a loaded state. In the runnable state, at least a lowermost part of the wheel 113 is located below the bottom surface 101*c* of the cargo container 100 and supports the cargo container 100 such that the cargo container 100 is allowed to run. In the loaded state, the wheel 113 moves inward (upward) from the bottom surface 101*c* of the cargo container 100 such that the bottom surface 101*c* of the cargo container 100 is allowed to make contact with the mount surface, such as ground, of the cargo container 100. More specifically, each wheel 113 is supported by a wheel support arm 112. The wheel support arm 112 is attached to a wheel state switching portion 114, and is, for example, driven to swing by, for example, an unillustrated electric motor of the wheel state switching portion 114, as indicated by arrows A in the drawing. That is, while each wheel 113 is at a position indicated by solid lines in the drawing, the cargo container 100 is supported and allowed to run, whereas while the wheel 113 is retracted to a position indicated by chain double-dashed lines, the cargo container 100 is allowed to be loaded on a container ship or the like or stacked with other cargo containers, in a manner similar to general cargo containers conforming to the standard or the like.

As described above, the wheels 113 allowed to be retracted or pushed, for example, toward the inside of the cargo container 100 enable transportation and storage as in general cargo containers, and can ease traveling of the cargo container 100 without using a trailer, a carriage, or the like before loading or after unloading on/from a container ship. That is, it is possible to avoid loading and unloading on/from a trailer or the like, and in addition, it is also possible to ease efficient movement of a plurality of cargo containers at the same time in parallel. Loading and unloading on/from barges and ships as shown in FIGS. 5 through 9 of Japanese Patent No. 6216094 and FIGS. 1, 2, and 5 and related portions of Japanese Patent No. 6144860 can be easily carried out without using carriages. Specifically, conveying cargo containers unloaded from a container ship or the like to another berth, for example, and unloading cargo containers from barges and loading cargo containers on trailers can be easily carried out without using a container crane placed on a container port. Thus, availability of container cranes and berths can be easily enhanced.

Second Embodiment

Figure 2:
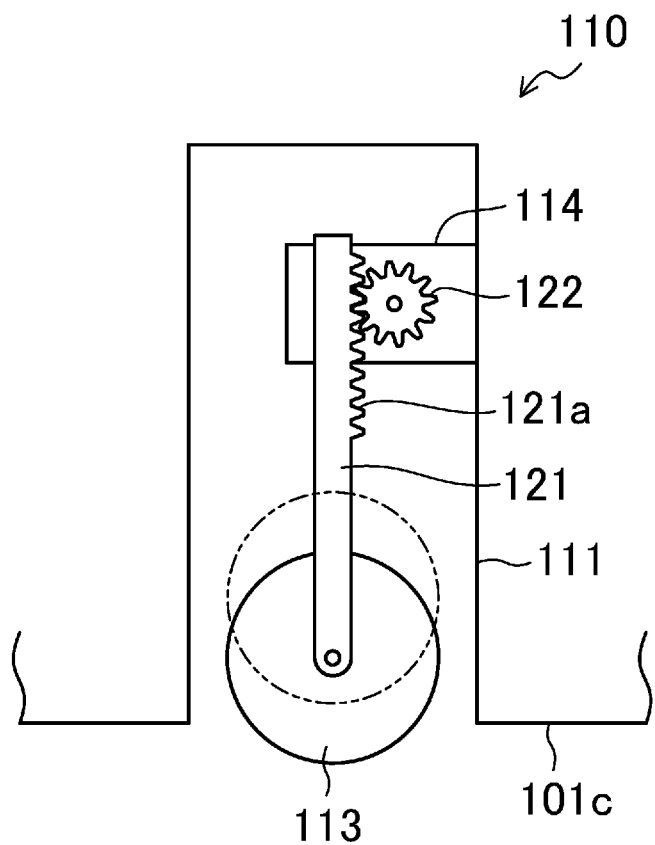
FIG. 2 A side view illustrating a configuration of a main portion of a cargo container according to a second embodiment.

Various configurations are also applicable to switching of positions of the wheels 113. As illustrated in FIG. 2, for example, the wheel support arm 121 may be supported to be linearly movable vertically (top-bottom directions), and a rack 121a provided to the wheel support arm 121 may be driven by a pinion 122 that is driven to be rotatable by the wheel state switching portion 114. In this case, it is relatively easy to reduce a lateral size of the wheel portion 110, for example.

Third Embodiment

Figure 3:
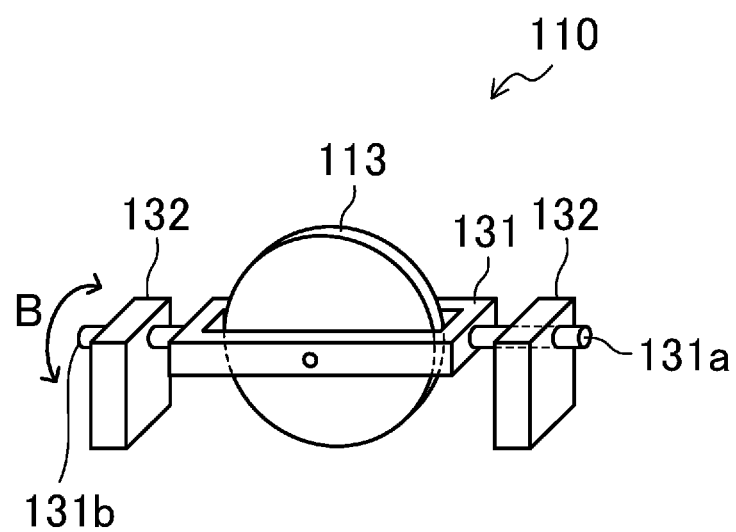
FIG. 3 A perspective view illustrating a configuration of a main portion of a cargo container according to a third embodiment.

As illustrated in FIG. 3, for example, the wheel 113 may be supported by a frame-shaped wheel support arm 131, and pivoting axes 131a and 131b that are orthogonal to a rotation axis of the wheel 113 and disposed at both sides of the wheel support arm 131 may be pivotably supported by bearings 132 as indicated by arrows B. In this case, it is relatively easy to reduce a height of the wheel portion 110 to a small dimension, for example.

Fourth Embodiment

Figure 4:
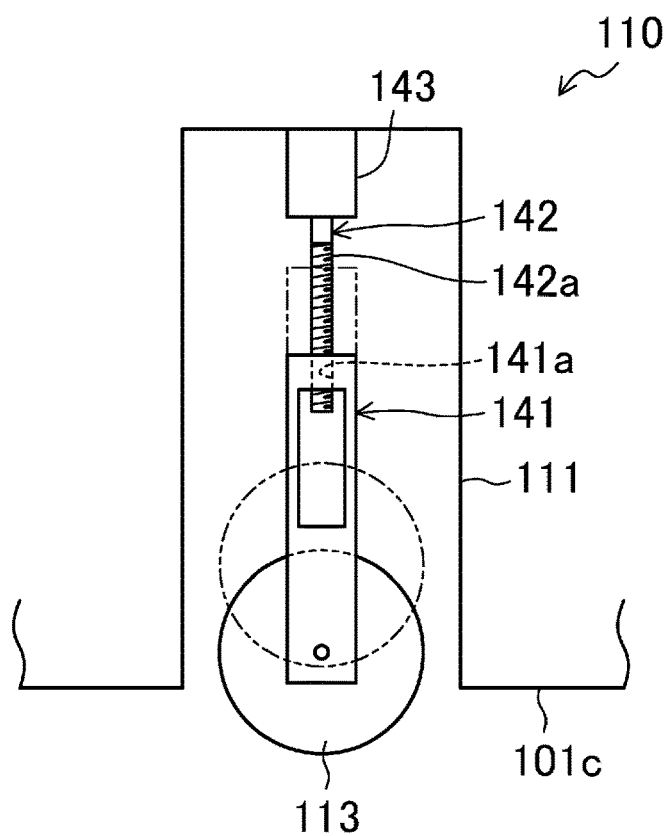
FIG. 4 A perspective view illustrating a configuration of a main portion of a cargo container according to a fourth embodiment.

As illustrated in FIG. 4, for example, a female thread 141a may be formed on the wheel support arm 141 so that the wheel 113 can be pulled and retracted by positively and reversely rotating, with a motor 143, a rotation shaft 142 provided with a male thread 142a to be screwed to the female thread 141a.

Fifth Embodiment

Figure 5:
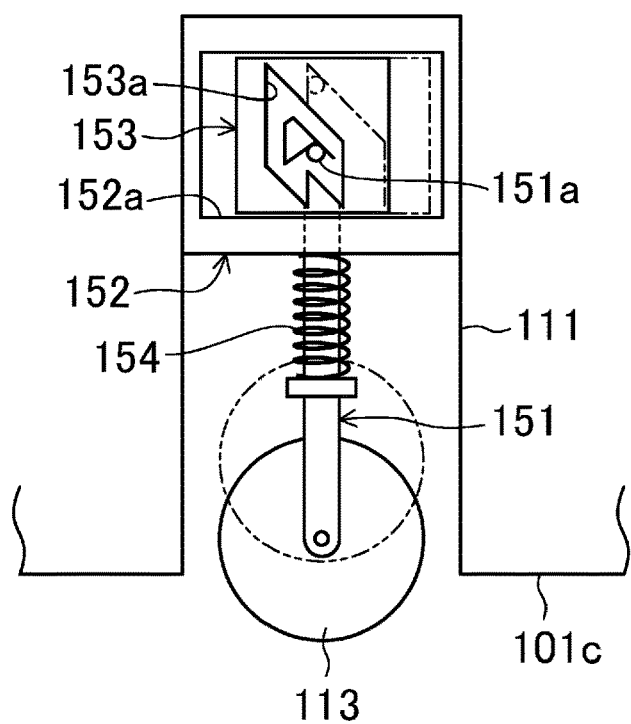
FIG. 5 A perspective view illustrating a configuration of a main portion of a cargo container according to a fifth embodiment.

The state of the wheel portion 110 may be switched by vertically moving the cargo container 100 with a gantry crane or a forklift, for example. Specifically, as illustrated in FIG. 5, for example, a pin 151a is provided in an upper portion of the wheel support arm 151, and a cam plate 153 is disposed in a slide window 152a of a slide frame 152 to be horizontally (laterally) slidable so that the pin 151a of the wheel support arm 151 is movable along a cam groove 153a formed in the cam plate 153 as illustrated in the drawing.

The wheel support arm 151 may be biased downward by a spring 154 when necessary. Accordingly, every time the wheel 113 moves downward to a predetermined distance from the runnable state, the pin 151a is locked in the runnable state at a position indicated by the solid line in the drawing or the wheel 113 is allowed to be pushed upward such that the cargo container is in the loaded state at a position indicated by the chain double-dashed line. A mechanism for enabling such switching is not limited to the example described above, and various latch mechanisms or the like of the same type may be applied in such a manner that a cylindrical member having one or more developed shapes such as the cam plate 153 is rotatably provided.

Other Components

The wheels 113 are not specifically limited to a specific material, and rubber tires may be used, or solid rubber wheels or iron wheels, for example, may be used.

To switch the state of the wheels 113, the electric motor is not necessarily used, and other drivers such as a hydraulic motor or an air motor may be used, or the switching may be performed by manually operating a lever, a wheel, or the like, or a combination thereof. Alternatively, retraction of the wheels may be locked or unlocked when the wheels come to the runnable state by, for example, self-weight due to simple upward movement of the cargo container. Specifically, with a configuration similar to that of the fifth embodiment, instead of the cam plate 153, a plate having a wedge or stepped shape may be used such that the plate is manually caused to slide horizontally, for example, to lock or unlock upward movement of the pin 151a.

Each of the wheels 113 may be capable of transferring a driving force with, for example, a link, a chain, a rotation shaft, or the like to enable the switching in mechanical cooperation with other wheels. Alternatively, each the wheel portion 110 may include an electric motor such that the state can be switched mechanically independently of the other wheels. In the case of the cooperation, a driving device, an operation device, and other components can be easily shared by the wheel portions 110, and thus, configurations of the wheel state switching portion 114 and other components can be easily simplified and fabrication costs can be easily reduced. On the other hand, in the case of performing the switching independently, no space is needed for a link and other components for coupling the wheel portions 110, and thus, internal space of the cargo containers 100 can be easily kept.

The cargo container 100 may run by its self-power by providing a driving unit for driving and rotating the wheels 113. A steering mechanism may be provided to easily change the traveling direction. A suspension may also be provided to enable suppression and reduction of, for example, vibrations with respect to unevenness and steps on road surfaces.

The configurations described above are applicable to containers to be loaded on freight cars, aircrafts, and the like and used for transporting cargo vessels.

DESCRIPTION OF REFERENCE CHARACTERS 100 cargo container
101 shell
101a door
101b engaging portions
101c bottom surface
110 wheel portion
111 wheel partition 112 wheel support arm
113 wheel
114 wheel state switching portion
121 wheel support arm
121a rack
122 pinion
131 wheel support arm
131a, 131b pivoting axis
132 bearing
141 wheel support arm
141a female thread
142 rotation shaft
142a male thread
143 motor
151 wheel support arm
151a pin
152 slide frame
152a slide window
153 cam plate
153a cam groove
154 spring

The invention claimed is:

1. A cargo container for marine transportation of cargo, and the cargo container comprising:
engaging portions disposed at four corners of each of upper and lower surfaces of a shell, each of the engaging portions being engageable with a spreader of a container crane; and
a plurality of wheel portions each including a wheel configured to support the cargo container such that the cargo container is allowed to run, each of the plurality of wheel portions also including a pin provided on an upper portion of a wheel support arm, and a cam member configured to move to allow vertical movement of the pin relative to the cam member for affecting a corresponding vertical movement of the wheel, wherein
each of the plurality of wheels are switchable between a runnable state and a loaded state by incurring vertical movement upward or downward upon movement of the cam member and vertical movement of the pin, wherein in the runnable state, at least a lowermost portion of the wheel is located below a bottom surface of the cargo container and supports the cargo container such that the cargo container is allowed to run, and in the loaded state, the wheel moves upward from a bottom surface of the cargo container and the bottom surface is allowed to make contact with a mount surface, and
each of the plurality of wheels switches from the loaded state to the runnable state every time the respective wheel moves downward a first predetermined distance beyond the runnable state and thereafter moves upward to the runnable state, and
each of the plurality of wheels switches from the runnable state to the loaded state every time the respective wheel moves downward a second predetermined distance beyond the runnable state and thereafter moves upward to the loaded state.

2. The cargo container according to claim 1, wherein at least one of the wheels is capable of switching between the states mechanically independently of other wheels.

3. The cargo container according to claim 1, wherein at least two of the wheels are capable of switching between the states mechanically in cooperation with the other wheels.

4. The cargo container according to claim 1, further comprising a driving unit configured to drive and rotate at least one wheel.

5. A cargo container loading/unloading method for loading and/or unloading the cargo container according to claim 1 onto/from a container ship, the method comprising at least one of:
lifting the cargo container in the runnable state on a berth where a container crane is placed, with an engaging portion of the cargo container being engaged with a spreader of the container crane, and then loading the cargo container onto the container ship; or
before unloading the cargo container from the container ship, lifting the cargo container in the loaded state in which the bottom surface of the cargo container is allowed to make contact with a mount surface of the container ship, with the engaging portion of the cargo container being engaged with a spreader of a container crane, and then unloading the cargo container to a berth where the container crane is placed.

* * * * *